(12) United States Patent  (10) Patent No.: US 8,475,321 B2
Gutsmiedl et al.  (45) Date of Patent: Jul. 2, 2013

(54) DIFFERENTIAL ASSEMBLY

(75) Inventors: Peter Gutsmiedl, Wysoka (PL);
Thomas Riedmann, Ingolstadt (DE)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 13/435,906

(22) Filed: Mar. 30, 2012

(65) Prior Publication Data

US 2012/0252624 A1  Oct. 4, 2012

Related U.S. Application Data

(60) Provisional application No. 61/470,854, filed on Apr. 1, 2011.

(51) Int. Cl.
*F16H 48/20* (2012.01)
(52) U.S. Cl.
USPC .......................................... 475/248
(58) Field of Classification Search
None
See application file for complete search history.

(56) References Cited

U.S. PATENT DOCUMENTS

| | | |
|---|---|---|
| 3,706,239 A | 12/1972 | Myers |
| 4,365,524 A | 12/1982 | Dissett et al. |
| 5,620,389 A | 4/1997 | Sato |
| 5,785,624 A | 7/1998 | Mayr |
| 5,842,946 A | 12/1998 | Ichiki |
| 5,976,051 A | 11/1999 | Madsack et al. |
| 6,013,004 A | 1/2000 | Gage et al. |
| 6,053,838 A | 4/2000 | Gage |
| 6,325,737 B1 | 12/2001 | Zinke et al. |
| 6,422,971 B1* | 7/2002 | Katou et al. ................... 475/331 |
| 6,599,217 B2* | 7/2003 | Caringella et al. ............ 475/220 |
| 6,634,979 B1* | 10/2003 | Quaife .......................... 475/249 |
| 6,866,607 B2 | 3/2005 | Nishiji et al. |
| 7,022,041 B2 | 4/2006 | Valente |
| 7,758,466 B2* | 7/2010 | Kato et al. .................... 475/331 |
| 2004/0216556 A1 | 11/2004 | Smith et al. |
| 2010/0081535 A1* | 4/2010 | Gutsmiedl ................... 475/228 |

FOREIGN PATENT DOCUMENTS

KR  20010059763 A  7/2001

OTHER PUBLICATIONS

International Search Report and Written Opinion of the International Searching Authority dated Oct. 29, 2012, for International Application No. PCT/US2012/031646.

* cited by examiner

*Primary Examiner* — Dirk Wright
(74) *Attorney, Agent, or Firm* — Harness, Dickey & Pierce, P.L.C.

(57) ABSTRACT

A differential assembly having a gearset, which has first and second side gears and a plurality of pinion sets, and a case assembly. Each pinion set has a first pinion meshingly engaged to the first side gear, and a second pinion meshingly engaged to both the second side gear and the first pinion gear. The case assembly has a case structure, a case cover and a gearset mount. The case structure defines a cavity into which the gearset mount is received. The gearset mount defines a plurality of first pinion bores into which the first pinions are received, a plurality of second pinion bores into which the second pinions are received and a side gear pocket into which the first side gear is received. The gearset mount is fixedly and non-rotatably coupled to the case cover. The case cover is separately coupled to the case structure.

19 Claims, 3 Drawing Sheets

DIFFERENTIAL ASSEMBLY

CROSS-REFERENCE TO RELATED APPLICATIONS

This application claims the benefit of U.S. Provisional Application No. 61/470,854, filed on Apr. 1, 2011, the disclosure of which is incorporated by reference as if fully set forth in detail herein.

FIELD

The present disclosure relates to a differential assembly.

BACKGROUND

This section provides background information related to the present disclosure which is not necessarily prior art.

Differential assemblies that employ a helical gearset, sometimes referred to as "parallel-axis differential assemblies", typically employ an extremely heavy-duty differential case for housing into which the gearset is received. One such parallel-axis differential assembly is disclosed in U.S. Pat. No. 5,842,946. The housing of a parallel-axis differential assembly typically defines a central bore that is intersected by sets of parallel bores. A pair of side gears are typically received in the central bore, while the sets of parallel bores house a pair of pinions. As is well known in the art, rotational energy input to the differential case is transmitted through the pinions into the side gears. The surfaces of the pinion bores are configured to provide desired frictional characteristics or tribological properties that permit the differential assembly to differentiate torque in a desired manner.

Since all of the rotary power that is transmitted to the gearset is transmitted through the differential case, and since the differential case is typically cast, the structure of the differential case tends to be extremely heavy, which drives up the total mass and cost of the differential assembly. Moreover, it can be difficult and/or costly in some situations to alter the tribological properties of the differential case given for example limitations on the material of the differential case and/or the size or mass of the differential case. Accordingly, there remains a need in the art for a parallel-axis differential having improved performance, reduced cost, and/or reduced mass.

SUMMARY

This section provides a general summary of the disclosure, and is not a comprehensive disclosure of its full scope or all of its features.

In one form the present teachings provide a differential assembly having a gearset and a case assembly. The gearset includes first and second side gears and a plurality of pinion sets. Each pinion set has a first pinion, which is meshingly engaged to the first side gear, and a second pinion that is meshingly engaged to both the second side gear and the first pinion gear. The case assembly has a case structure, a case cover and a gearset mount. The case structure defines a cavity into which the gearset mount is received. The gearset mount defines a plurality of first pinion bores, a plurality of second pinion bores and a side gear pocket. The first pinions are received in the first pinion bores. The second pinions are received in the second pinion bores. The first side gear is received in the side gear pocket. The gearset mount is fixedly and non-rotatably coupled to the case cover. The case cover is separately coupled to the case structure.

In another form, the present teachings provide a method for assembling a differential assembly, the method comprising: providing a gearset mount; assembling a gearset to the gearset mount, the gearset comprising first and second side gears and first and second pinions, the first pinions meshingly engaging the first side gear, the second pinions meshingly engaging the first pinions and the second side gear; providing a case structure and a cover structure; inserting the gearset and the gearset mount into a bore in the case structure; and mounting the cover structure to the case structure to secure the gearset and the gearset mount in the case structure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
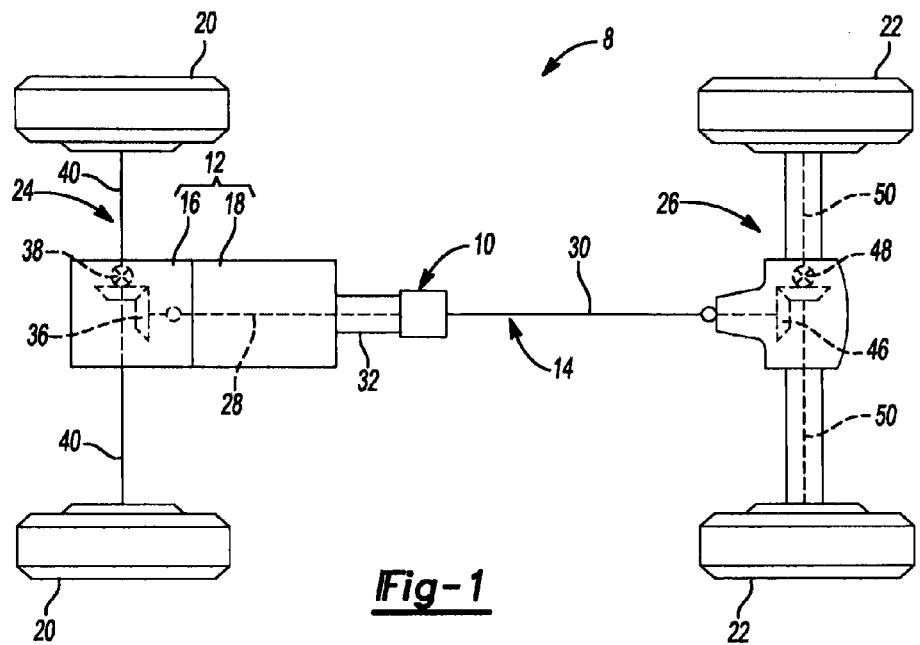
FIG. 1 is a schematic illustration of a vehicle having a center differential constructed in accordance with the teachings of the present disclosure.

With reference to FIG. 1 of the drawings, a vehicle 8 having a differential assembly (i.e., center differential 10) constructed in accordance with the teachings of the present disclosure is schematically illustrated. While the particular differential assembly illustrated and described herein is a center differential assembly, it will be appreciated that the teachings of the present disclosure have application to other types of differential assemblies, including those used as final drives in a rear and/or front axle assembly.

The vehicle 8 can comprise a powertrain 12 and a drivetrain 14. The powertrain 12 can comprise any device for generating and transmitting rotary power, such as an internal combustion engine 16 and a transmission 18. The drivetrain 14 can be configured to transmit rotary power from the powertrain 12 to the front and rear wheels 20 and 22, respectively, of the vehicle 8. In the particular example provided, the drivetrain 14 comprises the center differential 10, a front axle assembly 24, a rear axle assembly 26, a front output propshaft 28 and a rear output propshaft 30. The center differential 10 can be drivingly coupled to an input propshaft 32 (which can be an output member of the transmission 18), as well as to the front and rear output propshafts 28 and 30. The front axle assembly 24 can include a front or first pinion 36, which can be drivingly coupled to the center differential 10 via the front output propshaft 28, and a front or first differential 38 that can receive rotary power from the first pinion 36 and transmit rotary power via two shafts 40 to the front wheels 20. Similarly, the rear axle assembly 26 can include a rear or second pinion 46, which can be drivingly coupled to the center differential 10 via the rear output propshaft 30, and a rear or second differential 48 that can receive rotary power from the second pinion 46 and transmit rotary power via two shafts 50 to the rear wheels 22.

Figure 2:
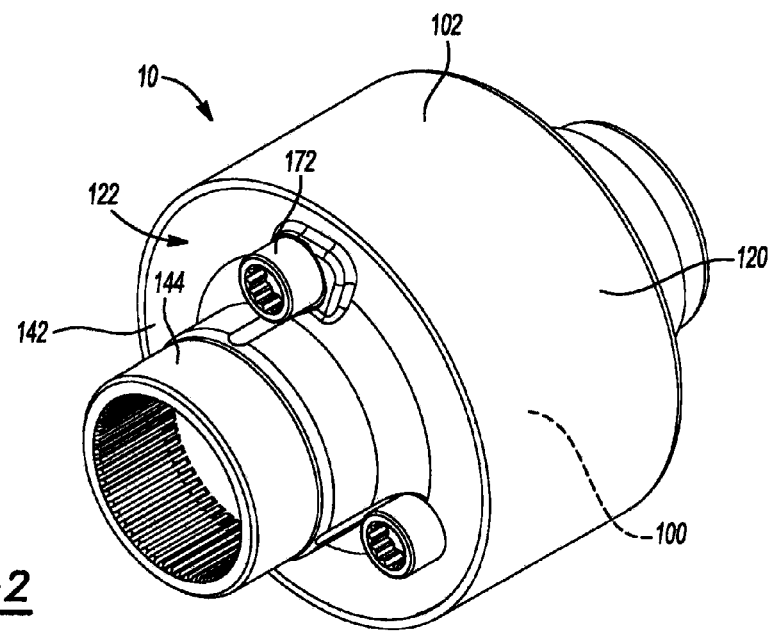
FIG. 2 is a perspective view of a portion of the vehicle of FIG. 1 illustrating the center differential in more detail.
Figure 3:
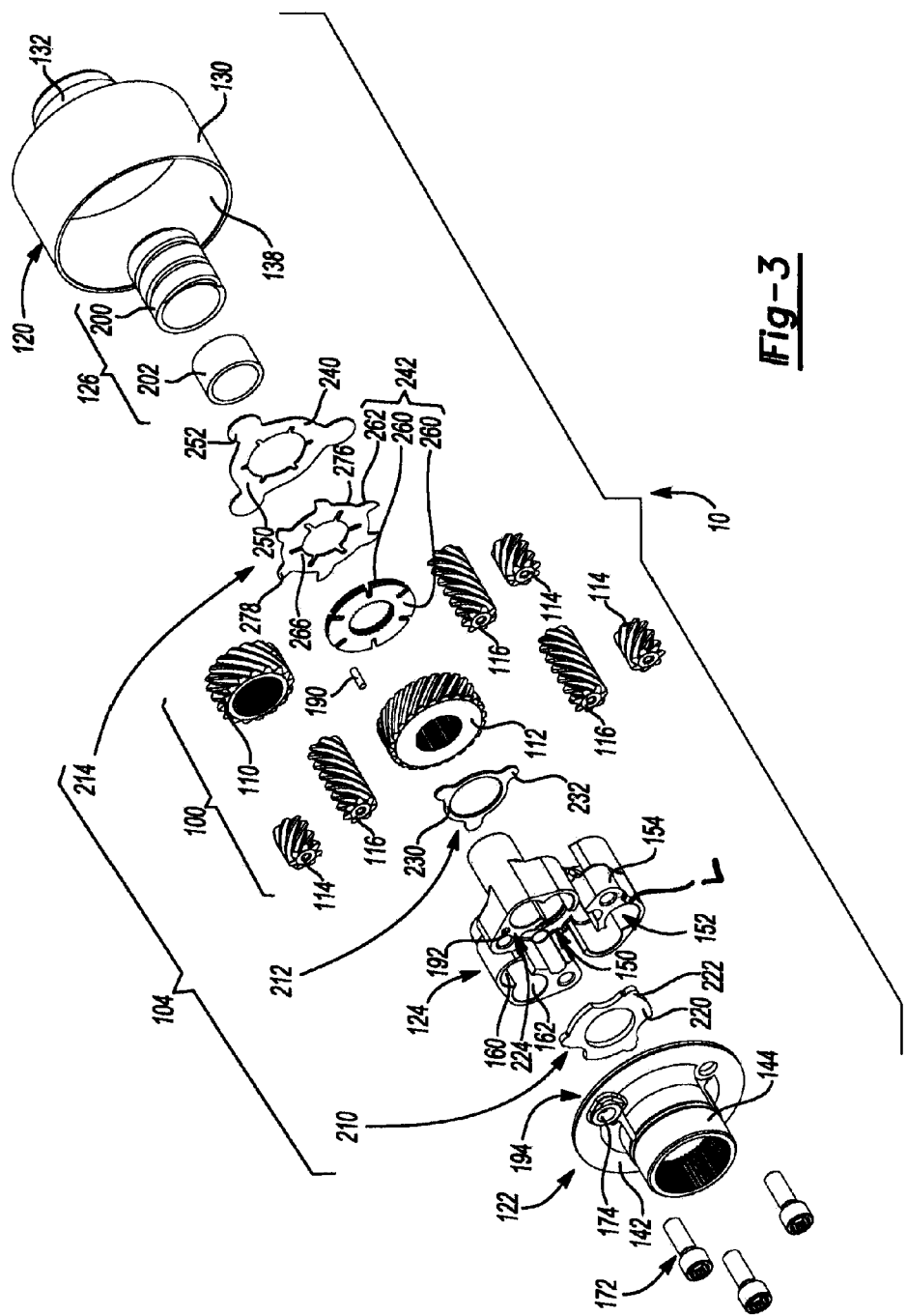
FIG. 3 is an exploded perspective view of the center differential.
Figure 4:
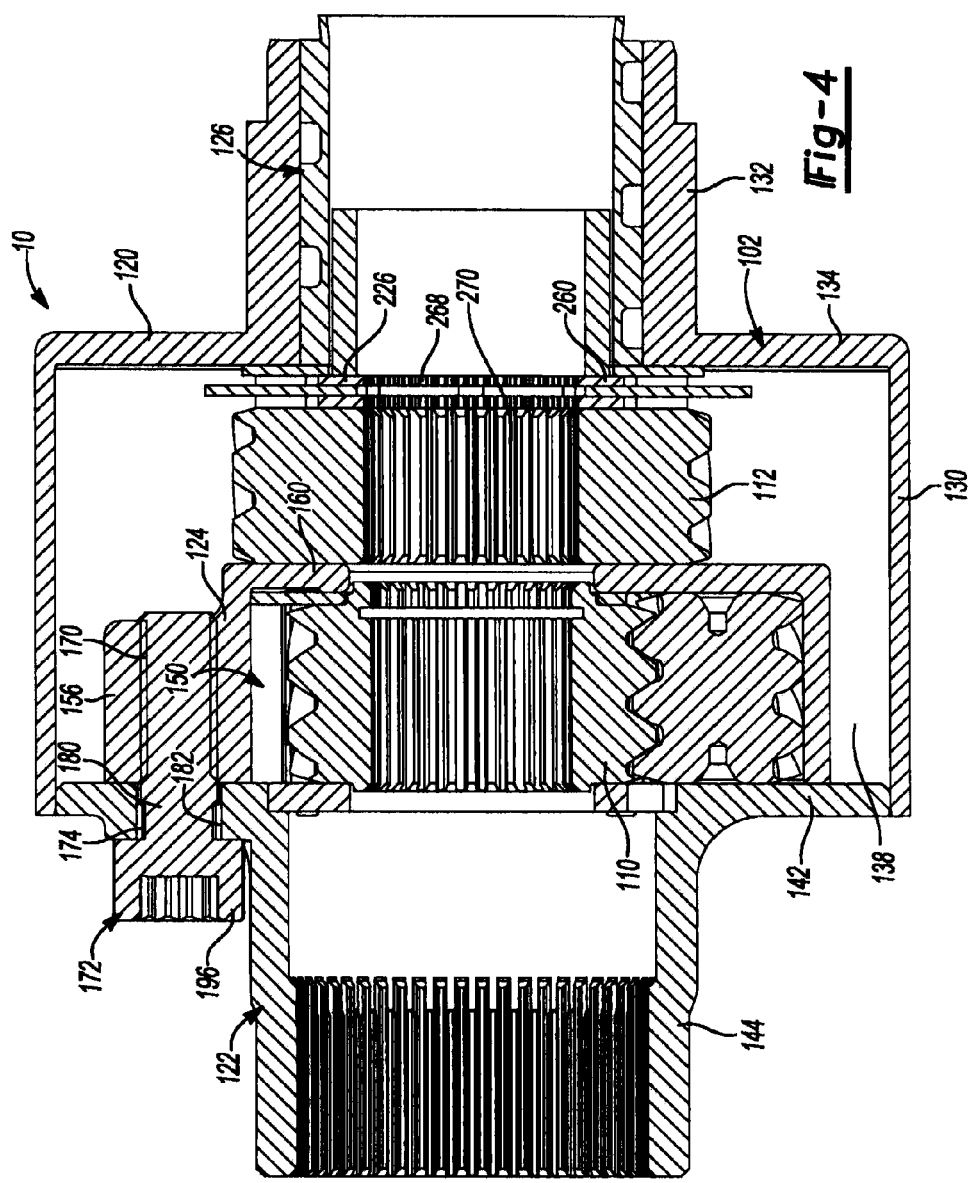
FIG. 4 is a longitudinal section view of a portion of the center differential.

With reference to FIGS. 2 through 4, the center differential 10 can comprise a gearset 100, a case assembly 102 and a set of friction plates 104.

The gearset 100 can include a first side gear 110, a second side gear 112, a plurality of first pinions 114, and a plurality of second pinions 116. The first pinions 114 can be meshingly engaged with the first side gear 110, while the second pinions can be meshingly engaged with the second side gear 112. In the particular example provided, the second side gear 112 has a pitch diameter that is larger than a pitch diameter of the first side gear 110 so as to permit relatively more torque to be transmitted to the rear differential 48 (FIG. 1) than the front differential 38 (FIG. 1), i.e., a 60/40 torque split between the rear and front differentials 48 and 38 is employed in the particular example provided. It will be appreciated, however, that the first and second side gears 110 and 112 can be sized differently to control the torque split between the front and rear differentials 38 and 48 (FIG. 1) in a desired manner, such as a 50/50 torque split if the teachings of the present disclosure are employed in a final drive.

The case assembly 102 can comprise a case structure 120, a case cover 122, a gearset mount 124, and a bushing 126.

The case structure 120 can comprise a first annular wall member 130, a second annular wall member 132 and an annular shoulder wall 134 that is disposed between and connects the first and second annular wall members 130 and 132. The first annular wall member 130 can define a cavity 138 into which the gearset 100 can be received. The second annular wall member 132 and the shoulder wall 134 can be configured to receive therethrough the rear output propshaft 30 (FIG. 1), which can rotatably couple the second side gear 112 to the rear differential 48 (FIG. 1). In the particular example provided, the case structure 120 is unitarily formed via deep drawing, but it will be appreciated that the case structure 120 could be formed by other means, including sintering (compacted powdered metal), welding and casting.

The case cover 122 can include a mounting flange 142 and an input member 144 that can be fixedly coupled to the mounting flange 142 (e.g., welded). In the particular example provided, the case cover 122 is unitarily formed in an appropriate process (e.g., forging, casting).

The mounting flange 142 can be configured to be coupled to the first annular wall member 130 on a side opposite the shoulder wall 134 to close the cavity 138. Any desired means, including fasteners, mating threads, roll forming, crimping and/or one or more welds, may be employed to couple the mounting flange 142 to the first annular wall member 130. If desired, the mounting flange 142 can include mating features that prevent rotation of the case cover 122 relative to the case structure 120. In the example provided, the mounting flange 142 is sized to be received into the cavity 138 to permit the axial spacing between the mounting flange 142 and the shoulder wall 134 to be set to a desired spacing; the mounting flange 142 is thereafter welded to the first annular wall member 130. It will be appreciated that the desired setting may be a predetermined axial spacing, or it may be based on the overall axial length of the particular gearset 100 and the particular set of friction plates 104 that are received in the cavity 138 (to thereby minimize the effect of stack-up tolerance and control backlash of the gearset 100 to a desired level).

The input member 144 can be an annular (hollow tubular) structure that can be drivingly engaged to the end of the input propshaft 32 (FIG. 1) that is opposite the transmission 18 (FIG. 1). Any desired means can be employed to couple the input propshaft 32 (FIG. 1) to the input member 144, such as a set of mating internal splines or teeth.

The gearset mount 124 can be received in the cavity 138 and can fix the elements of the gearset 100 into their desired positions. The gearset mount 124 can form the required friction surfaces and provide the desired tribological properties while reducing the cost and overall mass of the center differential 10 as compared to a prior art center differential. The gearset mount 124 can define a side gear pocket 150, a plurality of pinion bore sets 152, and one or more mounts 154. The gearset mount 124 can be formed of any desired material (e.g., steel, bronze, aluminum, sintered powdered metal, ceramic, polymer, composite) having desired wear and friction properties. The material may be coated (e.g., phosphate, calcium overbased sulfonating, anodizing), surface treated (e.g., nicked surface treatment), and/or impregnated with a lubricating substance (e.g., oil, graphite) to enhance the wear resistance and/or to provide desired friction characteristics to surfaces that experience sliding friction.

The side gear pocket 150 can be sized to receive the first side gear 110 and can terminate at an annular end wall 160. The annular end wall 160 can form a friction surface against which one or more of the first side gear 110, the second side gear 112 and the first pinions 114 can abut. The pinion bore sets 152 can be disposed circumferentially about the side gear pocket 150. Each pinion bore set 152 can include a first pinion bore 160 and a second pinion bore 162 that can extend axially into the gearset mount 124 from a first axial side of the gearset mount 124 that abuts the mounting flange 142. The first pinion bore 160 can be sized to receive an associated one of the first pinions 114 and the second pinion bore 162 can be sized to receive an associated one of the second pinions 116. The first and second pinion bores 160 and 162 of each pinion bore set 152 can radially overlap to permit the associated one of the first pinions 114 to meshingly engage the associated one of the second pinions 116. Each first pinion bore 160 can also radially overlap the side gear pocket 150 to facilitate meshing engagement of the first pinions 114 with the first side gear 110. In the example provided, the first pinion bore 160 terminates at the annular end wall 160 that defines an axial end of the side gear pocket 150, while the second pinion bore 162 extends axially through the gearset mount 124.

The mount(s) 154 can be configured to fixedly couple the gearset mount 124 to the case cover 122 and can be tailored to the particular mounting means that is employed. For example, the mount 154 can comprise a lip or flange member that can be fastened to the mounting flange 142 via roll forming or welding (e.g., laser welding). In the particular example provided, the mounts 154 comprise threaded bores 170 that are disposed proximate the pinion bore sets 152. Threaded fasteners 172 can be received through holes 174 in the mounting flange 142 and threadably engaged to the threaded bores 170 to produce a clamping force that non-rotatably couples the gearset mount 124 to the case cover 122. If desired, one or more locating features can be employed to aid in precisely locating a central axis of the gearset mount 124 to a central axis of the input member 144. In the example provided, locating features employed to align the central axes of the gearset mount 124 and the input member 144 to one another comprise shoulders 180 (FIG. 4) on the fasteners 172 that engage the circumferential surface 182 of the holes 174 in the mounting flange 142, as well as one or more dowel pins 190 that can be received into corresponding pin holes 192 and 194 in the gearset mount 124 and the mounting flange 142, respectively. The dowel hole 194 in the mounting flange 142 can be a blind hole that does not extend completely through the mounting flange 142. If desired, seals (not shown) can be received on the threaded fasteners 172 (e.g., between the head 196 and the shoulder 180) and can form a fluid-tight seal between the mounting flange 142 and the fasteners 172. It will be appreciated, however, that other means may be employed to precisely locate the central axis of the gearset mount 124 to the central axis of the input member 144. For example, shoulder bolts could be employed in lieu of the fasteners 172 and the precision shoulder of the shoulder bolt received in a precision bored portion of the mount 154. As another example, a dowel screw could be substituted for the dowel pin 190. As a further example, a portion of the gearset mount 124, such as a lug L, could be configured to nest precisely into the case cover 122, for example in a hole (not shown) configured to receive the lug L.

Those of skill in the art will appreciate that because the gearset mount 124 is fixedly coupled directly to the case cover 122, rotary power is not transmitted to the gearset 100 through the case structure 120. As such, the case structure 120 need only shroud the gearset 100 (i.e., the case structure need not be configured to carry the rotary load between the input propshaft 32 (FIG. 1) and the gearset 100).

The bushing 126 can comprise any type of bushing or bearing that can be employed to aid in supporting the case structure 120 for rotation on the rear output propshaft 32 (FIG. 1). The bushing 126 can be configured to provide desired tribological characteristics. In the particular example provided, the bushing 126 comprises a helically-coiled spacer 200, which is received into the second annular wall member 132 in the case structure 120, and a bushing element 202 that is received into the spacer 200 in an interference-fit manner.

The set of friction plates 104 can comprise a first plate set 210, an intermediate plate set 212 and a second plate set 214. The first plate set 210 can be received in the side gear pocket 150 and can be disposed axially between the mounting flange 142 and the first side gear 110. The first plate set 210 can include any quantity of plate members but in the particular example provided, the first plate set 210 comprises a singular first thrust washer plate. The first thrust washer plate can have a body 220, which can be engaged directly to an axial surface of the first side gear 110, and a plurality of tabs 222 that extend radially from the body 220. The tabs 222 can be received into corresponding tab apertures 224 formed in axial end of the gearset mount 124 to thereby non-rotatably couple the first thrust washer plate to the gearset mount 124. The first thrust washer plate can be configured to abut only the first side gear 110 or if desired could also be configured to engage an axial end of the first pinion 114 and/or the second pinion 116. It will be appreciated that the first thrust washer plate can be formed with a desired surface finish and/or hardness and/or surface coating and/or treatment to provide desired wear resistance and tribological proprieties.

The intermediate plate set 212 can be non-rotatably coupled to the gearset mount 124 and can be disposed axially between the annular end wall 160 of the gearset mount 124 and first side gear 110. The intermediate plate set 212 can comprise any quantity of plate members but in the particular example provided the intermediate plate set 212 comprises a singular intermediate thrust washer plate having a body 230, which can be engaged to an axial surface of the first side gear 110, and a plurality of tabs 232 that extend radially from the body 230. The tabs 232 can be received into an associated one of the first pinion bores 160. It will be appreciated that the intermediate thrust washer plate (i.e., the body 230 and/or the tabs 232) can be formed with a desired surface finish and/or hardness and/or surface coating and/or treatment to provide desired wear resistance and tribological properties.

The second plate set 214 can be received axially between the second side gear 112 and the shoulder wall 134 of the case structure 120 and can comprise a second thrust washer 240 and a set of friction discs 242. The second thrust washer 240 can include a body 250, which can axially abut the shoulder wall 134 and the set of friction discs 242, and a plurality of tabs 252 that are received into the second pinion bores 162 in the gearset mount 124 to thereby non-rotatably couple the second thrust washer 240 to the gearset mount 124. The set of friction discs 242 can comprise one or more first plate members 260 and one or more second plate members 262 that can be interleaved with the first plate members 260. The first plate members 260 can have a body 266 that comprises a suitable friction material and which defines a suitable locking element, such as a plurality of splines 268. The splines 268 match the splines 270 formed in the second side gear 112 so that the mating splines (not specifically shown) formed on the rear output propshaft 30 (FIG. 1), which are engaged to the spines 270 formed in the second side gear 112, will matingly engage the splines 268 to non-rotatably couple the first plate members 260 to the second side gear 112 for rotation therewith. The second plate member(s) 262 can comprise a body 276, which can abut the body 266 of one or more of the first plate members 260, and a plurality of tabs 278 that can be received into the second pinion bores 162 in the gearset mount 124 to thereby non-rotatably but axially slidably couple the second plate members 262 to the gearset mount 124. In the particular example illustrated, the set of friction discs 242 comprise a pair of first plate members 260 that are disposed on opposite sides of a single second plate member 262. It will be appreciated, however, that other quantities of first and second plate members 260 and 262 could be employed and that the quantity of second plate members 262 could be greater than the quantity of first plate members 260 if desired.

Those of skill in the art will appreciate that the second plate set 214 is configured to provide a friction force that exceeds the friction force generated by the first plate set 210 to provide the center differential 10 with a torque split that is configured to transmit relatively more torque to the rear differential 48 (FIG. 1). It will be appreciated that the set of friction plates 104, if provided, could be configured differently, for example to produce a desired torque split.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A differential assembly comprising:
a gearset comprising first and second side gears and a plurality of pinion sets, each pinion set having a first pinion, which is meshingly engaged to the first side gear, and a second pinion that is meshingly engaged to both the second side gear and the first pinion gear; and
a case assembly having a case structure, a case cover and a gearset mount, the case structure defining a cavity into which the gearset mount is received, the gearset mount defining a plurality of first pinion bores, a plurality of second pinion bores and a side gear pocket, the first pinions being received in the first pinion bores, the sec- ond pinions being received in the second pinion bores, the first side gear being received in the side gear pocket, the gearset mount being fixedly and non-rotatably coupled to the case cover, the case cover being separately coupled to the case structure.

2. The differential assembly of claim 1, wherein one of the case structure and the case cover defines a first annular wall member having a plurality of internal splines formed thereon.

3. The differential assembly of claim 2, further comprising a bushing that is received into a second annular wall member formed in the other one of the case structure and the case cover.

4. The differential assembly of claim 1, wherein a plurality of threaded fasteners are received through the case cover and threadably engaged to the gearset mount.

5. The differential assembly of claim 1, wherein a portion of the gearset mount is received axially between the first and second side gears.

6. The differential assembly of claim 1, wherein the gearset mount is formed of a non-ferrous material.

7. The differential assembly of claim 1, wherein the non-ferrous material is selected from a group consisting of bronze, aluminum, ceramics and polymers.

8. The differential assembly of claim 1, further comprising a set of friction plates for affecting friction between at least one of:
the first side gear and the case cover,
the second side gear and the case structure, and
the gearset mount and the first side gear.

9. The differential assembly of claim 8, wherein the set of friction plates comprises a plurality of first plate members non-rotatably coupled to the case structure and a plurality of second plate members non-rotatably coupled to the second side gear, the second plate members being interleaved with the first plate members.

10. The differential assembly of claim 1, wherein the first pinions are disposed between the gearset mount and the case cover.

11. The differential assembly of claim 1, wherein the first pinions are shorter than the second pinions.

12. The differential assembly of claim 1, wherein the case structure defines a cylindrical bore, wherein the cover structure has an outer circumferential surface that is complementary to an interior circumferential surface of the cylindrical bore, and wherein the cover structure contacts the case structure only where the outer circumferential surface contacts the interior circumferential surface.

13. The differential assembly of claim 12, wherein the cover structure is welded to the case structure.

14. A method for assembling a differential assembly, the method comprising:
providing a gearset mount;
assembling a gearset to the gearset mount, the gearset comprising first and second side gears and first and second pinions, the first pinions meshingly engaging the first side gear, the second pinions meshingly engaging the first pinions and the second side gear;
providing a case structure and a cover structure; and
inserting the gearset and the gearset mount into a bore in the case structure; and
mounting the cover structure to the case structure to secure the gearset and the gearset mount in the case structure.

15. The method of claim 14, wherein mounting the cover structure to the case structure comprises:
sliding the cover structure into the bore in the case structure; and
welding the cover structure to the case structure.

16. The method of claim 15, wherein prior to welding the cover structure to the case structure the method further comprises positioning the cover structure at a predetermined distance relative to the case structure.

17. The method of claim 15, wherein prior to welding the cover structure to the case structure the method further comprises positioning the cover structure relative to the case structure by an amount that is dependent upon an axial length of a set of components disposed in the bore in the case structure axially between the case structure and the cover structure, the set of components comprising the gearset mount and the gearset.

18. The method of claim 17, wherein the set of components further comprises a set of friction plates.

19. The method of claim 18, wherein the set of friction plates affects friction between at least one of:
the first side gear and the case cover,
the second side gear and the case structure, and
the gearset mount and the first side gear.

* * * * *